April 6, 1937.  Ö. RISZDORFER  2,076,482
PHOTOGRAPHIC APPARATUS
Filed Nov. 8, 1933  2 Sheets-Sheet 2

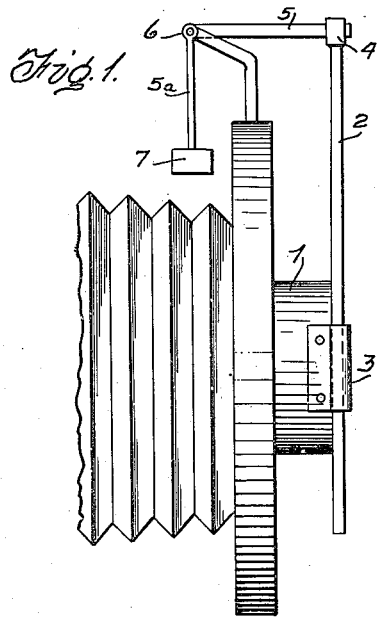
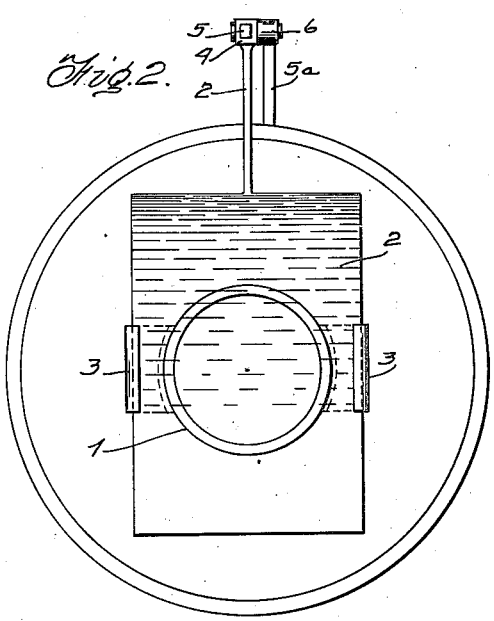
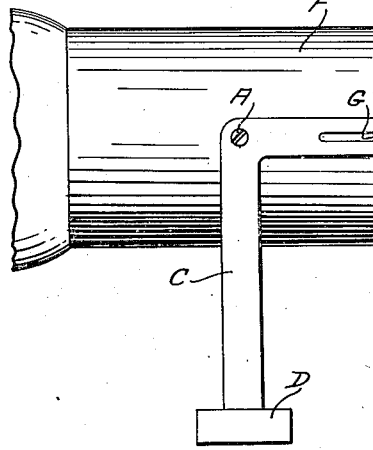
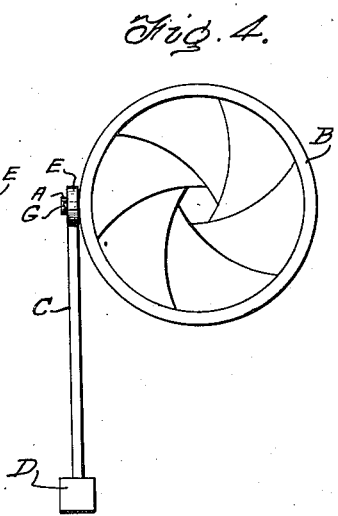

INVENTOR.
O. Riszdorfer,
BY
Frank S. Appleman,
ATTORNEY

Patented Apr. 6, 1937

2,076,482

UNITED STATES PATENT OFFICE 2,076,482

PHOTOGRAPHIC APPARATUS

Ödön Riszdorfer, Budapest, Hungary

Application November 8, 1933, Serial No. 697,179
In Hungary November 10, 1932

16 Claims. (Cl. 95—81.5)

This invention relates to an arrangement for photographic cameras or illumination meters which is intended to act on the light passing through the objective lens into the camera or the illuminometer and has for its object to effect compensation of different degrees of illumination of sky and foreground, that is to effect a damping of the light according to the degree of inclination of the camera with regard to the horizontal, so that more or less light passes from the sky into the camera. In the construction of the invention this compensating influence on the light entering the camera is effected automatically by a light regulator arranged in the path of such light and which consists of at least one screen that is displaceable transversely to the direction of the rays of light combined with a freely swinging pendulum which is connected with the screen in such a way that by the movement of the pendulum the screen is, corresponding to the degree of inclination of the camera with regard to the horizontal, moved more or less into the path of the rays of light. The screen or screens may be impenetrable to light, and in such a case several may be provided, which may be actuated in the manner of an iris diaphragm by the pendulum. Thereby the amount of light entering the apparatus is influenced. But it is possible also to provide an actinic filter as a screen, which filter is moved more or less deeply into the path of the light rays by the pendulum so that the actinity of the light entering the camera is controlled.

The figures show some embodiments of the arrangement according to the invention.

Fig. 1 is a side elevation of one form of the invention as applied to a photographic camera.

Fig. 2 is a front elevation thereof.

Fig. 3 is a side elevation of a modified form of the invention as used in connection with the iris diaphragm of a camera.

Fig. 4 is a front elevation of the arrangement shown in Fig. 3.

Figure 5:
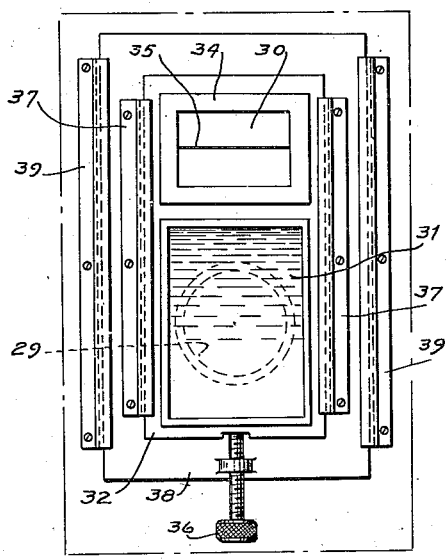
Fig. 5 is a front elevation of a second modification of the invention wherein a light filter used therewith may be manually adjusted with relation to a camera objective.

In the embodiment shown in Figs. 1 and 2, a filter 2 of graduated colouring can be moved up and down in fixed guides 3 in front of the objective-mounting 1. The filter is suspended from an angular lever 5, which turns about the fixed pin 6 and has a perpendicular arm 5a, loaded with a weight 7. If the camera stands in a normal horizontal position, then the lower part of the coloured portion of the filter 2 covers about one half of the objective, so that the filter is effective for the rays coming from above the horizon and thus for the sky. If the camera is inclined downwards the weight raises the filter 2 accordingly, so that a smaller portion of the latter than before is effective. If on the other hand the camera is tilted upwards, the weight lowers the filter 2, so that a greater portion of the latter is effective.

According to the invention the quantity of light entering into an apparatus can be influenced with the aid of the above described pendulous suspension by another darkening-device instead of a filter, e. g. by a diaphragm set by the pendulum.

In the form shown in Figs. 3 and 4, the rays of light pass through an adjustable diaphragm B. This diaphragm is set by a pendulum which is pivoted on an axis A and forms an angular lever having a vertical arm carrying a weight D. In the horizontal arm E there is provided a slot H in which the pin G of the setting ring of the diaphragm B slides.

Figure 6:
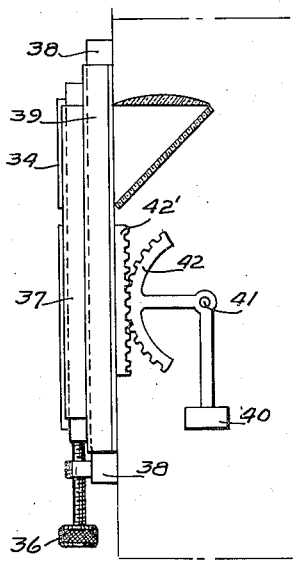
Fig. 6 is a side elevation of the arrangement shown in Fig. 5.

In the manner described the amount of the light entering into a photoelectric cell can also be regulated, especially in the case of photoelectric cells provided on photographic apparatus or exposure-timers. There also a darkening-device is advantageously set by means of the pendulum described. In Figs. 5 and 6, I is the photoelectric cell, in front of which the graduated filter 2 can be moved up and down in the guides 3. The suspension on the angular lever 5, 5a, 6 with the pendulum-weight 7 is similar to the suspension shown in Fig. 1.

When taking pictures, the horizon is not at the same height on all occasions. To compensate for this, apparatus may, in accordance with the invention, also be so constructed that the darkening devices may be made adjustable according to the height of the horizon. Figs. 5 and 6 show such an arrangement, more particularly for construction in which the objective lens 29 and the finder 30 are arranged above each other. In such case a filter 31 is mounted in a displaceable frame 32, in whose upper recess 34 there is formed, in front of the finder 30, a horizontal line 35, which in the finder picture lies in the like relative height as the lower edge of the colored field of the filter in front of the objective. The frame 32 is adjustable in height by means of the screw 36. The setting screw 36 and the guide 37 of the frame 32 are fastened to a support 38 which is displaceable vertically in a fixed guide and is moved by a pendulum 40 which is pivoted on a pin 41 fastened in the apparatus and meshes by means of a toothed segment 42 with the rack 42' fastened to the frame 38. The mark 35 is set in the finder picture, depending on conditions, by means of the screw 36 according to the height of the horizon, whereby simultaneously and mechanically the filter 31 is accordingly displaced.

Figure 7:
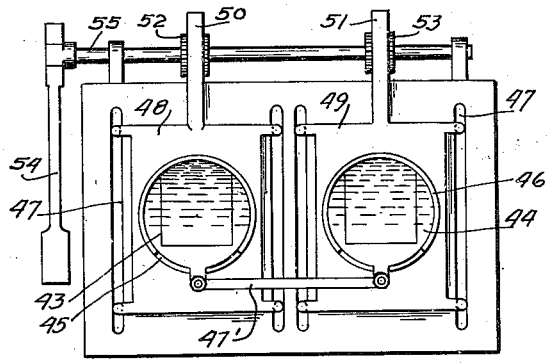
Fig. 7 is a front elevation of a further modification of the invention as arranged for adjustment to suit angularity of a sky line.
Figure 8:
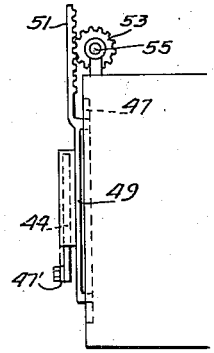
Fig. 8 is a side elevation of the arrangement shown in Fig. 7.

Figs. 7 and 8 show a construction in which the filter may be set in accordance with the inclination of the horizon. 43 is a filter provided in front of the finder and 44 is a filter provided in front of a lens. These filters are held individually in the rotatably positioned disks 45 and 46, while the latter are connected together by means of a rod 47'. Also, both filters are vertically displaceable together with their supports 48 and 49 in guides 47. For this purpose, the filters 48 and 49 are provided with racks 50 and 51 with which mesh the pinions 52 and 53 fastened on a shaft 55 which is actuated by a pendulum 54 and which raise or lower the filters together and mechanically.

What I claim is:

1. The combination with a photographic apparatus having a front provided with a light receiving opening, said apparatus having an optical axis passing through said opening and normally in predetermined relation to the horizontal; of a light transmitting screen movable transverse said axis, means for guiding said screen in a vertical path, a pendulum pivoted to said apparatus to swing about an axis perpendicular to the vertical plane wherein said optical axis lies, and an operative connection between said pendulum and screen to move the screen in its path upon tilting of the apparatus about a horizontal axis extending at right angles to said plane.

2. The combination with a photographic apparatus having a normally horizontal optical axis and having a light receiving opening on said axis; of a light transmitting screen movable across said opening in a vertical path, a pendulum mounted on said apparatus to swing in a normally vertical plane parallel to said optical axis, and an operative connection between the screen and pendulum arranged to raise the screen upon the forward end of the apparatus being depressed and to depress the screen upon the forward end of the apparatus being raised.

3. The combination with a photographic apparatus having a front provided with a light receiving opening, said apparatus having an optical axis passing through said opening and normally in predetermined relation to the horizontal; of a light transmitting screen movable transversely of said axis, means for guiding said screen in a vertical path, a pendulum pivoted to said apparatus to swing about an axis perpendicular to the vertical plane wherein said optical axis lies, and an operative connection between said pendulum and screen to move the screen in its path upon tilting of the apparatus about a horizontal axis extending at right angles to said plane, said screen having its upper part of less transparency than its lower part.

4. The combination with a photographic apparatus having a normally horizontal optical axis and having a light receiving opening on said axis; of a light transmitting screen movable across said opening in a vertical path, a pendulum mounted on said apparatus to swing in a normally vertical plane parallel to said optical axis, and an operative connection between the screen and pendulum arranged to raise the screen upon the forward end of the apparatus being depressed and to depress the screen upon the forward end of the apparatus being raised, said screen having its upper part of less transparency than its lower part.

5. The combination with a photographic apparatus having a front provided with a light receiving opening, said apparatus having an optical axis passing through said opening and normally in predetermined relation to the horizontal; of a light transmitting screen movable transversely of said axis, means for guiding said screen in a vertical path, a pendulum pivoted to said apparatus to swing about an axis perpendicular to the vertical plane wherein said optical axis lies, and an operative connection between said pendulum and screen to move the screen in its path upon tilting of the apparatus about a horizontal axis extending at right angles to said plane, said screen having a lower part of relatively great transparency and an upper part of relatively less transparency, said parts being defined from each other by a normally horizontal line.

6. The combination with a photographic apparatus having a normally horizontal optical axis and having a light receiving opening on said axis; of a light transmitting screen movable across said opening in a vertical path, a pendulum mounted on said apparatus to swing in a normally vertical plane parallel to said optical axis, and an operative connection between the screen and pendulum arranged to raise the screen upon the forward end of the apparatus being depressed and to depress the screen upon the forward end of the apparatus being raised, said screen having a lower part of relatively great transparency and an upper part of relatively less transparency, said parts being defined from each other by a normally horizontal line.

7. The combination with a photographic apparatus having a front provided with a light receiving opening, said apparatus having an optical axis passing through said opening and normally in predetermined relation to the horizontal; of a screen holder movable transversely of said opening, means guiding said holder in a predetermined vertical path, a pendulum pivoted to said apparatus to swing about an axis perpendicular to the vertical plane wherein said optical axis lies, an operative connection between said pendulum and holder to move the holder in its path as the apparatus is tilted about a horizontal axis perpendicular to said plane, a light transmitting screen, and means to support said screen shiftably in said frame.

8. The combination with a photographic apparatus having a normally horizontal optical axis and having a light receiving opening on said axis; of a screen frame movable across said opening in a vertical path, a pendulum mounted on said apparatus to swing in a normally vertical plane parallel to said axis, an operative connection between said pendulum and frame and arranged to raise and lower the frame as the front of the apparatus is tilted down and up, and an optical light transmitting screen adjustably mounted in said frame.

9. The combination with a photographic apparatus having a front provided with a light receiving opening, said apparatus having an optical axis passing through said opening and normally in predetermined relation to the horizontal; of a screen holder movable transversely of said opening, means guiding said holder in a predetermined vertical path, a pendulum pivoted to said apparatus to swing about an axis perpendicular to the vertical plane wherein said optical axis lies, an operative connection between said pendulum and holder to move the holder in its path as the apparatus is tilted about a horizontal axis perpendicular to said plane, a light transmitting screen, and means to support said screen shiftably in said frame, said screen having a lower part of relatively great transparency and an upper part of relatively less transparency, said parts being defined from each other by a normally horizontal line.

10. The combination with a photographic apparatus having a normally horizontal optical axis and having a light receiving opening on said axis; of a screen frame movable across said opening in a vertical path, a pendulum mounted on said apparatus to swing in a normally vertical plane parallel to said axis, an operative connection between said pendulum and frame and arranged to raise and lower the frame as the front of the apparatus is tilted down and up, and an optical light transmitting screen adjustably mounted in said frame, said screen having a lower part of relatively great transparency and an upper part of relatively less transparency, said parts being defined from each other by a normally horizontal line.

11. The combination with a photographic apparatus having a normally horizontal optical axis and having a light receiving opening on said axis; of a screen frame movable across said opening in a vertical path, a pendulum mounted on said apparatus to swing in a normally vertical plane parallel to said axis, an operative connection between said pendulum and frame and arranged to raise and lower the frame as the front of the apparatus is tilted down and up, and an optical light transmitting screen adjustably mounted in said frame to rotate in a plane at right angles to said axis, said screen having a lower part of relatively great transparency and an upper part of relatively less transparency, said parts being defined from each other by a straight line.

12. The combination with a photographic apparatus having a normally horizontal optical axis and having a light receiving opening on said axis; of a screen frame movable across said opening in a vertical path, a pendulum mounted on said apparatus to swing in a normally vertical plane parallel to said axis, an operative connection between said pendulum and frame and arranged to raise and lower the frame as the front of the apparatus is tilted down and up, and an optical light transmitting screen adjustably mounted in said frame to move vertically therein, said screen having lower and upper parts defined from each other by a normally horizontal line and the upper part being of less transparency than the lower part, and means to adjust the screen in its frame.

13. The combination with a photographic apparatus having a normally horizontal optical axis and having a light receiving opening on said axis; of a light transmitting screen movable across said opening in a vertical path, a pendulum mounted on said apparatus to swing in a normally vertical plane parallel to said optical axis, an operative connection between the screen and pendulum arranged to raise the screen upon the forward end of the apparatus being depressed and to depress the screen upon the forward end of the apparatus being raised, a view finder for said apparatus and carried thereby, and a second screen in the path of light to said view finder similar to the first screen and connected to move in unison with said first screen.

14. The combination with a photographic apparatus having a normally horizontal optical axis and having a light receiving opening on said axis; of a screen frame movable across said opening in a vertical path, a pendulum mounted on said apparatus to swing in a normally vertical plane parallel to said axis, an operative connection between said pendulum and frame and arranged to raise and lower the frame as the front of the apparatus is tilted down and up, an optical light transmitting screen adjustably mounted in said frame, a view finder for said apparatus and carried thereby, and a second screen in the path of light to said view finder similar to the first screen and connected to move in unison with said first screen.

15. The combination with a photographic apparatus having a normally horizontal optical axis and having a light receiving opening on said axis; of a screen frame movable across said opening in a vertical path, a pendulum mounted on said apparatus to swing in a normally vertical plane parallel to said axis, an operative connection between said pendulum and frame and arranged to raise and lower the frame as the front of the apparatus is tilted down and up, an optical light transmitting screen adjustably mounted in said frame to rotate in a plane at right angles to said axis, said screen having a lower part of relatively great transparency and an upper part of relatively less transparency, said parts being defined from each other by a straight line, a view finder carried by said apparatus, a second frame movable across the path of light to said finder, said second frame being connected to move in unison with the first frame, a second screen similar to the first screen mounted in said second frame to rotate in its frame similarly to the rotation of the first screen in its frame, and means connecting said screens to cause the same to rotate in unison.

16. In the combination with a photographic apparatus having a normally horizontal optical axis and having a light receiving opening on said axis; of a light transmitting screen movable across said opening in a vertical path, a pendulum mounted on said apparatus to swing in a normally vertical plane parallel to said optical axis, an operative connection between the screen and pendulum arranged to raise the screen upon the forward end of the apparatus being depressed and to depress the screen upon the forward end of the apparatus being raised, a second photographic appliance carried by the said apparatus and including a light receiving element, and a second screen in the path of light to said element, said second screen being similar to the first screen and movable in unison therewith.

ÖDÖN RISZDORFER.